Figure 1:
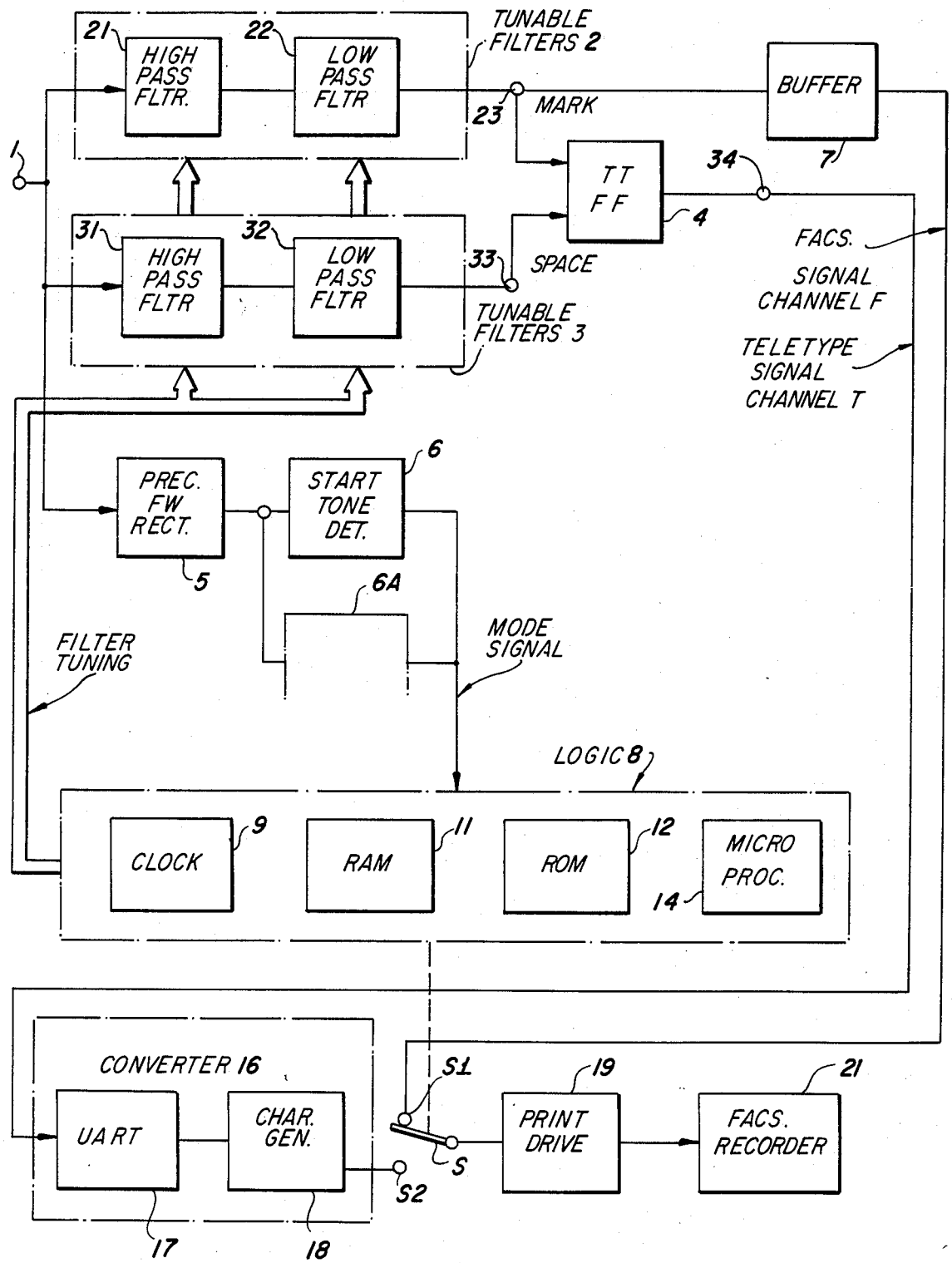

United States Patent [19]
Vano

[11] Patent Number: 4,719,517
[45] Date of Patent: Jan. 12, 1988

[54] TELETYPE COMPATIBLE FACSIMILE RECORDER

[75] Inventor: Gerald L. Vano, Brockton, Mass.

[73] Assignee: Alden Research Foundation, Brockton, Mass.

[21] Appl. No.: 831,842

[22] Filed: Feb. 24, 1986

[51] Int. Cl.⁴ .................. H04N 1/21; H04N 1/40; H04N 1/32
[52] U.S. Cl. .................. 358/296; 358/257; 358/280
[58] Field of Search .................. 358/257, 280, 296

[56] References Cited

U.S. PATENT DOCUMENTS

| | | | |
|---|---|---|---|
| 3,914,538 | 10/1975 | Perreault et al. | 358/257 |
| 4,092,675 | 5/1978 | Saran | 358/261 |
| 4,208,677 | 6/1980 | Schayes et al. | 358/280 |
| 4,533,956 | 8/1985 | Fedde | 358/280 X |

Primary Examiner—E. A. Goldberg
Assistant Examiner—Patrick W. Foster
Attorney, Agent, or Firm—James H. Grover

[57] ABSTRACT

A system for recording facsimile or teletype signals includes a switch connecting either signal to a graphic printer recording in raster format and means converting the teletype signals into raster format for recording on the same printer as are the facsimile signals.

5 Claims, 1 Drawing Figure

TELETYPE COMPATIBLE FACSIMILE RECORDER

BACKGROUND OF THE INVENTION

Facsimile signals representing graphic original material are generated by scanning the graphic original line by line to produce a rectangular array of generally parallel horizontal lines known as a raster familiar on television screens. Each line of the raster is a series of analog or digital pulses. The facsimile recorder which receives the facsimile signals prints them line by line on sensitive paper fed by a linear printing head.

Teletype signals represent alphanumeric characters of a predetermined configuration as compared to the random graphic elements of a facsimile weather map, for example, and are transmitted in a seven bit dot-dash code with a combination of five pulses for each character. Such coded on-off pulses would be recorded unintelligible if applied to a conventional facsimile recorder because they are not in raster form. It has been proposed that coded teletype signals be decoded for analog printing in computer systems, but prior systems have not been compatible with facsimile signal transmission.

Accordingly it is the object of the present invention to provide a facsimile system for recording with conventional facsimile signals and teletype signals and further to distinguish which of the two types of signals is received.

SUMMARY OF THE INVENTION

According to the invention a facsimile system for recording graphic signals comprises a facsimile signal channel carrying electrical signals in raster format; a teletype signal channel carrying electrical signals in pulse code format; a graphic signal printer for recording electrical signals in a raster format; and switch means for selectively connecting the facsimile channel or the teletype channel to the printer; wherein the teletype channel includes signal conversion means responsive to teletype signals to produce corresponding signals in raster format utilized by the printer so that both facsimile and teletype signals can be printed at the selection of the switch means.

DRAWING FIG. 1 is a schematic diagram of a facsimile recording system according to the invention.

DESCRIPTION

The system shown in FIG. 1 has an input terminal 1 to which both facsimile and teletype signals are supplied via radio, telephone or other lines. Whichever signal is received is applied to two tunable filters 2 and 3 which I do not claim as part of my invention. Each tunable filter includes a high pass filter 21 and 31 respectively and a low pass filter 22 and 32 respectively. The high pass filters 21, 31 and low pass filters 22, 32 respectively are type S3529 and S3528 programmable filters available from Gould AMI Semiconductors, Santa Clara, Calif. Each filter pair 21, 22 and 31, 32 precisely selects a narrow frequency band of the incoming signal and delivers an on-off pulse at output terminals 23 and 33 corresponding to the digital content of the facsimile or teletype information. The first pair of tunable filters 21 and 22 and a buffer 7 constitute a facsimile signal channel F connected to one contact S1 of a selector switch S. The second pair of tunable filters 31, 32 are in a teletype signal channel T through the filter output terminal 33, a teletype flip-flop 4 and a converter 16 to a second contact S2 of the selector switch S. The flip-flop 4 comprises two NAND gates type SN 74HC132 available from Texas Instruments, Inc., Dallas, Tex. and connected in a known set-reset, flip-flop configuration serving to refine the filtered signals at terminals 23 and 33 to a noise free coded pulse signal at the flip-flop output terminal 34.

The signal at the input terminal 1 is also applied through a precision full wave rectifier 5 to a parallel set of stages 6, 6A, etc. each of which detects the distinctive start tone of one of the incoming facsimile or teletype signals. The start tone occurs at the beginning of each frame or page of facsimile or teletype signals and initiates the recording of that frame or page. Also the particular stage 6 or 6A or other delivers a mode signal to a logic system 8, which informs the logic system whether a facsimile or teletype signal will follow.

The logic system 8 includes a clock 9 timing, a random access memory 11, a read only memory 12 and a microprocessor 14 which in a conventional manner process the incoming mode signal and transfer the selector switch according to whether a facsimile or teletype signal is received, and also supplies a filter tuning signal to the tunable filters 2 and 3 appropriate to the type of facsimile or teletype signal received.

According to the present invention in addition to supplying the facsimile signal in raster form to the selector switch S, the teletype channel includes a converter 16 which responds to coded teletype signals by producing corresponding graphic signals in raster form. The conversion is processed by a Universal Asynchronous Receiver Transmitter (UART) 17, type I8251 available from Intel Corporation, Santa Clara, Calif., which converts the serial form of coded teletype signals to parallel format. The parallel signals are applied to a character generator 18 such as model DM76S64 bipolar character generator available from National Semiconductor Corporation, Santa Clara, Calif. This character generator comprises a look up table which responds to the pulse coded teletype signals to read out signals in line by line, raster, format at the alternative contact S2 of the selector switch S.

According to the signal mode, teletype or facsimile, used by the logic system S to transfer the selector switch S, the selected facsimile or teletype signal in raster scan format is applied through a power amplifying printer drive 19 to any conventional facsimile raster format recorder 21.

The present facsimile system thus not only accommodates standard facsimile signals and pulse coded teletype signals determining the manner in which each type of signal is treated, but also senses and selects the appropriate signal to be applied to the facsimile recorder.

It should be understood that the present disclosure is for the purpose of illustration only and that this invention includes all modifications and equivalents which fall within the scope of the appended claims.

I claim:

1. A facsimile system for recording graphic signals comprising:
   a facsimile signal channel carrying electrical signals in raster format;
   a teletype signal channel carrying electrical signals in pulse code format;
   a graphic signal printer for recording electrical signals in a raster format; and switch means for selectively connecting the facsimile channel or the teletype channel to the printer;

wherein the teletype channel includes signal conversion means responsive to teletype signals to produce corresponding signals in raster format utilized by the printer so that both facsimile and teletype signals can be printed at the selection of the switch means.

2. A system according to claim 1 wherein the signal conversion means comprises a character generator.

3. A system according to claim 2 wherein the character generator comprises an electronic look-up table responsive to pulse coded signals to read out raster scan signals.

4. A system according to claim 1 including electronic means responsive to serially received signals to generate corresponding parallel signals.

5. A system according to claim 1 including control means responsive to the receipt of teletype signals to transfer the switch means so as to select the teletype channel.

* * * * *